(12) United States Patent
Fukuchi et al.

(10) Patent No.: US 12,194,761 B2
(45) Date of Patent: Jan. 14, 2025

(54) IMAGE FORMING APPARATUS CONFIGURED TO DIVIDE HEATING ELEMENTS TO BE ENERGIZED INTO A PLURALITY OF BLOCKS AND TO ENERGIZE THE PLURALITY OF BLOCKS AT DIFFERENT TIMINGS

(71) Applicant: BROTHER KOGYO KABUSHIKI KAISHA, Nagoya (JP)

(72) Inventors: Isao Fukuchi, Gifu (JP); Keisuke Nishihara, Nagoya (JP); Yuki Naruse, Toyoake (JP); Mina Takechi, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 75 days.

(21) Appl. No.: 18/049,032

(22) Filed: Oct. 24, 2022

(65) Prior Publication Data

US 2023/0125987 A1    Apr. 27, 2023

(30) Foreign Application Priority Data

Oct. 25, 2021  (JP) ................................. 2021-173780

(51) Int. Cl.
*B41J 2/335* (2006.01)
*B41J 2/355* (2006.01)
*G06K 15/02* (2006.01)
*B41J 2/35* (2006.01)
*G06K 15/00* (2006.01)

(52) U.S. Cl.
CPC ........... *B41J 2/33515* (2013.01); *B41J 2/355* (2013.01); *B41J 2/3551* (2013.01); *G06K 15/028* (2013.01); *B41J 2/35* (2013.01); *B41J 2/3558* (2013.01); *G06K 15/4055* (2013.01)

(58) Field of Classification Search
CPC ...... B41J 2/33515; B41J 2/355; B41J 2/3551; B41J 2/35; B41J 2/3558; G06K 15/028; G06K 15/4055
See application file for complete search history.

(56) References Cited

U.S. PATENT DOCUMENTS 6,002,417 A * 12/1999 No ......................... B41J 2/3551
                                                     347/180
2019/0351681 A1    11/2019 Minami et al.

FOREIGN PATENT DOCUMENTS

JP    2010-228259 A    10/2010
JP    2019-199072 A    11/2019

\* cited by examiner

*Primary Examiner* — Henok D Legesse
(74) *Attorney, Agent, or Firm* — KENEALY VAIDYA LLP

(57) ABSTRACT

An image forming apparatus includes: a thermal head including a plurality of heating elements; and a controller configured to execute a first one-line printing process to perform printing for one line. The first one-line printing process includes: dividing selected R heating elements into M blocks consisting of a 1-st block to an M-th block such that the M blocks include at least one high current block consisting of p heating elements and at least one low current block consisting of q heating elements; and energizing the M blocks at different timings. In a case where the 1-st block is the high current block, at least one block of the M blocks excluding the M-th block is the low current block. In a case where the 1-st block is the low current block, at least one block of the M blocks excluding the M-th block is the high current block.

5 Claims, 12 Drawing Sheets

IMAGE FORMING APPARATUS CONFIGURED TO DIVIDE HEATING ELEMENTS TO BE ENERGIZED INTO A PLURALITY OF BLOCKS AND TO ENERGIZE THE PLURALITY OF BLOCKS AT DIFFERENT TIMINGS

REFERENCE TO RELATED APPLICATIONS

This application claims priority from Japanese Patent Application No. 2021-173780 filed on Oct. 25, 2021. The entire content of the priority application is incorporated herein by reference.

BACKGROUND ART

There has been conventionally known an image forming apparatus that employs a thermal line head including a plurality of heating elements to perform printing on a printing medium. The plurality of heating elements for forming one line worth of an image are arranged in the thermal line head along a main scanning direction. The image forming apparatus is configured to drive the thermal line head by energizing the heating elements to generate heat.

There is a demand to suppress an amount of electric current simultaneously consumed by the thermal line head when forming one line worth of an image. Three known methods for suppressing electric current are described below.

In the first method, the heating elements of the thermal line head are divided into a plurality of blocks. The image forming apparatus uses a time division approach to heat the heating elements block by block. Hereinafter, printing performed according to the first method will be referred to as "divisional printing". In the second method, the image forming apparatus determines the average power required for printing one line at the current point in time within a range that does not exceed a predetermined upper power limit, on the basis of the amount of power consumed when printing a line prior to the current point in time. Hereinafter, printing performed according to the second method will be referred to as "feedback printing". In the third method, the electric current to be used for printing a line subsequent to the current point in time is predetermined according to the limitation of an overcurrent protection (OCP) circuit in the power supply. Hereinafter, printing performed according to the third method will be referred to as "feedforward printing."

DESCRIPTION

In a divisional printing, printing for one line is performed by executing a plurality of printing operations. Accordingly, a period of time required to print one line is longer than a period of time required to print one line in one printing operation. Further, when the divisional printing and the feedback printing are combined together, the increase in time required to print one line according to the divisional printing delays the timing at which the average power can be determined through the feedback printing. In this case, the electric current may exceed the OCP limitation when printing one line through the divisional printing. For this reason, combining the divisional printing with the feedforward printing may be considered.

However, when the divisional printing is simply combined with the feedforward printing, the electric current is determined according to the OCP limitation. Thus, this approach may not fully utilize the performance of the power supply and may not be able to reduce the time required for printing one line.

In view of the foregoing, it is an object of the present disclosure to provide an image forming apparatus capable of reducing a period of time required for performing printing for one line in a divisional printing.

In order to attain the above and other object, the present disclosure provides an image forming apparatus including: a thermal head; and a controller. The thermal head includes a plurality of heating elements arrayed in a main scanning direction. Each heating element is configured to generate heat by being energized. The thermal head is configured to form an image on a printing target on the basis of print data using the plurality of heating elements while moving in a sub scanning direction relative to the printing target. The controller is configured to execute a first one-line printing process to perform printing for one line extending in the main scanning direction. The first one-line printing process includes: dividing selected R heating elements into M blocks consisting of a 1-st block to an M-th block such that the M blocks include at least one high current block consisting of p heating elements of the selected R heating elements and at least one low current block consisting of q heating elements of the selected R heating elements, in which: R is a natural number greater than a natural number obtained by adding p to q; M is a natural number not less than three (3); p is a natural number greater than N2 and not greater than N1; q is a natural number not greater than N2; N1 is a maximum number of the heating elements that can be energized simultaneously in the plurality of heating elements; and N2 is a natural number smaller than N1; and energizing the M blocks at different timings in order of the 1-st block to the M-th block to thereby perform printing for the one line. In a case where the 1-st block is determined as the high current block in the dividing, at least one block of the M blocks excluding the M-th block is determined as the low current block. In a case where the 1-st block is determined as the low current block in the dividing, at least one block of the M blocks excluding the M-th block is determined as the high current block.

In the above structure, the image forming apparatus is configured to print an image for one line by dividing the plurality of heating elements in the thermal head to be energized into the total of M blocks and energizing the heating elements to generate heat at a different timing for each block. Here, the total of M blocks includes the at least one high current block and the at least one low current block that have different numbers of heating elements. The number of heating elements 73 included in the high current block is greater than the number of heating elements in the low current block. This method requires less time for performing printing than a method in which the heating elements are divided into blocks that are all low current blocks. Therefore, during a divisional printing in which printing is performed after dividing the heating elements into blocks, the image forming apparatus can shorten a period of time required for printing for one line.

OVERVIEW OF PRINTER 1

Hereinafter, a printer 1 according to one embodiment of the present disclosure will be described while referring to the accompanying drawings.

In the following description, the lower-left side, the upper-right side, the upper-left side, the lower-right side, the upper side, and the lower side in FIG. 1 will be defined as a front side, a rear side, a left side, a right side, an upper side, and a lower side of the printer 1, respectively.

Figure 1:
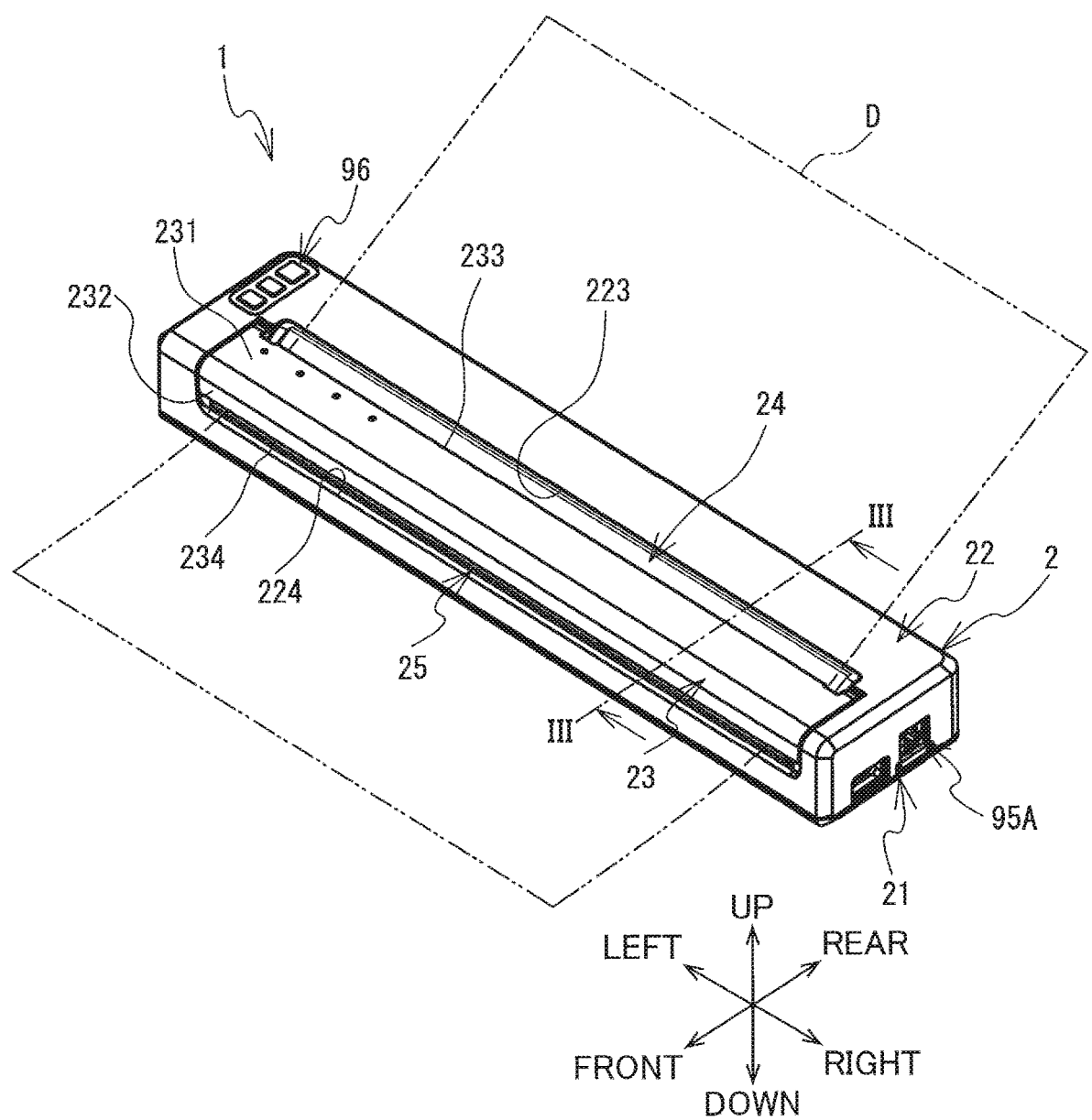
FIG. 1 is a perspective view of a printer.

The printer 1 illustrated in FIG. 1 is configured to form an image on a medium D on the basis of print data. The medium D is not limited to any specific medium, but may be in a sheet or a roll form, for example. In the present embodiment, a heat-sensitive cut paper is employed as the medium D.

Figure 2:
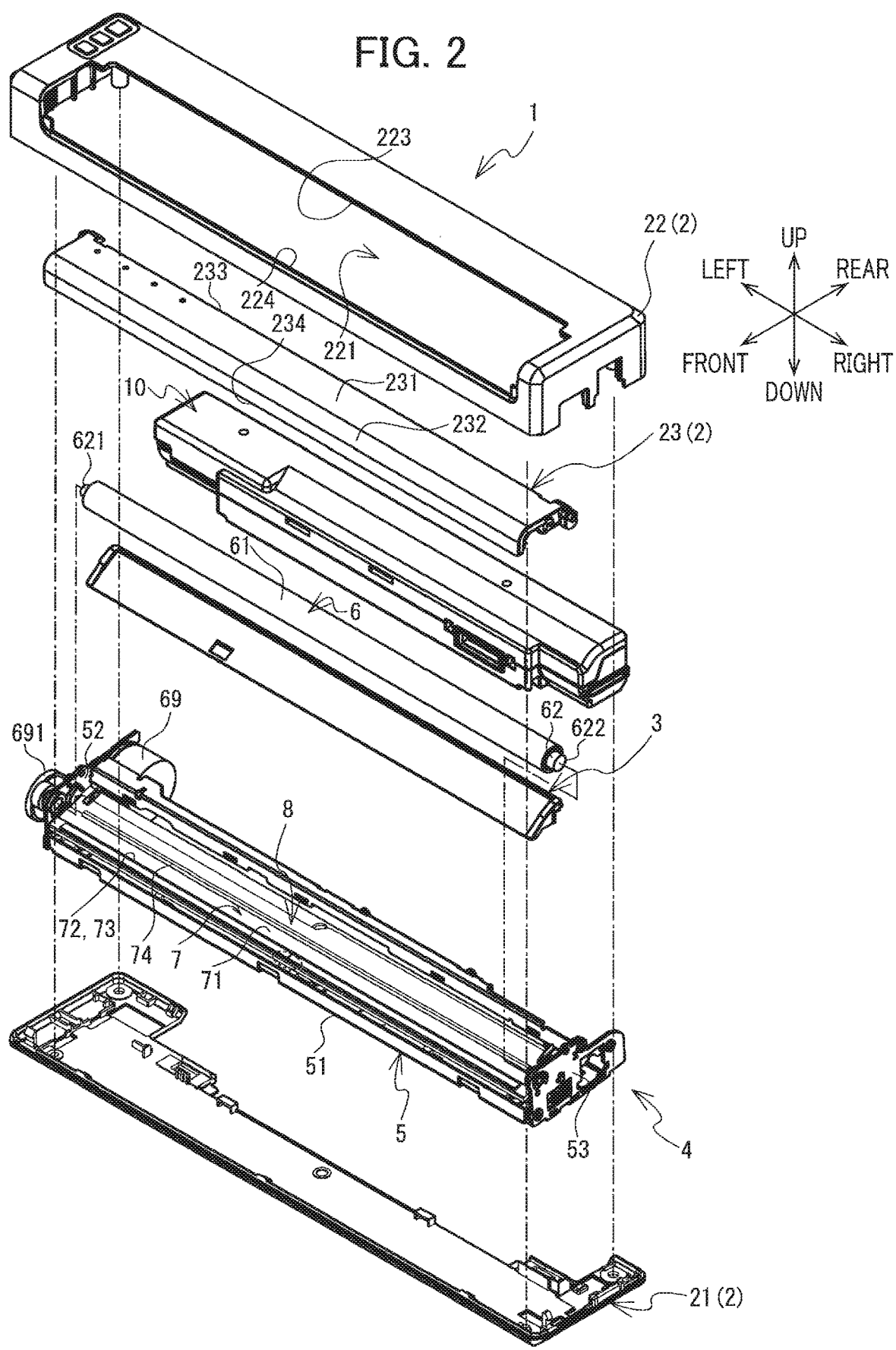
FIG. 2 is an exploded perspective view of the printer.

The printer 1 includes a case 2. The case 2 has a rectangular parallelepiped shape whose dimension in a left-right direction is greater than dimensions thereof in a front-rear direction and an up-down direction. A battery unit 10 illustrated in FIG. 2 is attachable to a lower-rear portion of the case 2. The battery unit 10 is configured to supply power to the printer 1 while the battery unit 10 is attached to the printer 1. An input part 96 is provided on an upper surface of the case 2 near a left end portion thereof. The input part 96 includes a plurality of push buttons. A USB jack 95A is provided on a right end portion of the case 2. The connector of a USB cable can be connected to the USB jack 95A.

As illustrated in FIGS. 1 and 2, the case 2 includes a lower cover 21, an upper cover 22, and an open-close cover 23. The lower cover 21 has a plate-like shape and extends in the front-rear direction and in the left-right direction. The lower cover 21 constitutes a bottom of the case 2.

The upper cover 22 opens downward and is assembled to the lower cover 21 from above. The upper cover 22 is formed with an opening 221. The opening 221 is open on a front surface and on an upper surface of the upper cover 22. Specifically, with respect to the up-down direction, the opening 221 extends from a center portion to an upper end of the front surface of the upper cover 22. With respect to the front-rear direction, the opening 221 extends from a front end to a center portion of the upper surface of the upper cover 22. Further, with respect to the left-right direction, the opening 221 extends from a position near a left end to a position near a right end of the upper cover 22. Hereinafter, in the upper cover 22, an end defining a rear end of the opening 221 will be referred to as "opening edge 223", and an end defining a lower end of the opening 221 will be referred to as "opening edge 224".

The open-close cover 23 is a plate-like member and includes a first portion 231 and a second portion 232. The first portion 231 extends in the front-rear direction and in the left-right direction. The second portion 232 extends downward from a front end of the first portion 231 and also extends in the left-right direction. The open-close cover 23 is configured to be fitted in the opening 221 of the upper cover 22. The first portion 231 has a rear end 233 rotatably supported by the upper cover 22. Accordingly, the open-close cover 23 is pivotally movable about the rear end 233 of the first portion 231 as a fulcrum such that the open-close cover 23 can open and close the opening 221.

Hereinafter, the description will be made based on a state illustrated in FIG. 1 where the open-close cover 23 closes the opening 221 (i.e., a closed state). In the closed state of the open-close cover 23, the rear end 233 of the first portion 231 faces the opening edge 223 of the opening 221 in the upper cover 22 with a gap therebetween in the front-rear direction. Further, a lower end 234 of the second portion 232 faces the opening edge 224 of the opening 221 in the upper cover 22 with a gap therebetween in the up-down direction.

An insertion slot 24 is formed in the upper surface of the case 2. The insertion slot 24 is an opening defined by the opening edge 223 of the upper cover 22 and the rear end 233 of the open-close cover 23. The medium D is supplied to an inner space of the case 2 through the insertion slot 24.

A discharge slot 25 is formed in a front surface of the case 2. The discharge slot 25 is an opening defined by the opening edge 224 of the upper cover 22 and the lower end 234 of the open-close cover 23. After printing is performed on the medium D inside the case 2, the medium D is discharged out of the case 2 through the discharge slot 25.

Figure 3:
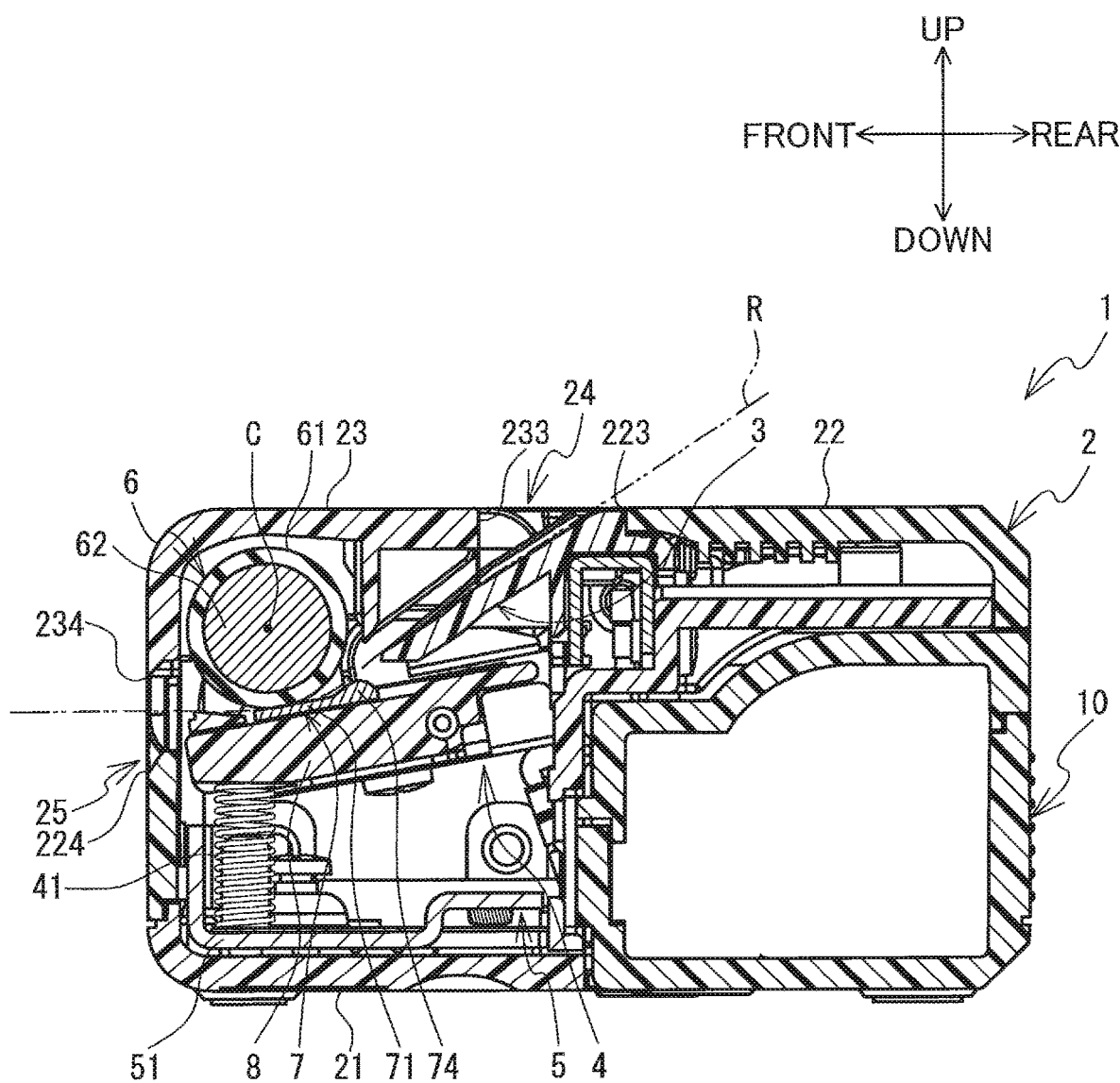
FIG. 3 is a cross-sectional view of the printer taken along a line in FIG. 1.

As illustrated in FIGS. 2 and 3, the printer 1 further includes a head unit 4. The head unit 4 is accommodated inside the case 2, and includes a support plate 5, a platen roller 6, a thermal head 7, and a heat sink 8. The support plate 5 includes a lower plate 51, a left plate 52, and a right plate 53. The lower plate 51 has a rectangular shape in a plan view whose dimension in the left-right direction is greater than a dimension in the front-rear direction. The lower plate 51 is fixed to an upper surface of the lower cover 21. The left plate 52 extends upward from a left end of the lower plate 51 and also extends in the front-rear direction. The right plate 53 extends upward from a right end of the lower plate 51 and also extends in the front-rear direction. The left plate 52 and the right plate 53 face each other in the left-right direction.

The platen roller 6 is provided at an upper-front portion inside the case 2 (see FIG. 3). The platen roller 6 extends in the left-right direction. The platen roller 6 includes a cylinder part 61, and a shaft 62. The cylinder part 61 is an elastic body and formed of, for example, rubber. The shaft 62 penetrates the cylinder part 61 and is fixed thereto. The shaft 62 has a left end 621 supported by the left plate 52, and has a right end 622 supported by the right plate 53. Accordingly, the platen roller 6 is rotatable about an axis C of the shaft 62.

The platen roller 6 is coupled to a motor 69 through a gear 691 and the like. The motor 69 is fixed to a right surface of the left plate 52 at a lower-rear portion thereof. The gear 691 is supported by the left plate 52 on a left side thereof. The platen roller 6 is rotatable upon receipt of a driving force of the motor 69 through the gear 691.

Referring to FIG. 3, the axis C of the shaft 62 serves as a rotation center C of the platen roller 6. The axis C (the rotation center C) passes through a center of the shaft 62 and extends in the left-right direction. By rotating about the rotation center C, the platen roller 6 can convey the medium D in a conveying direction. The conveying direction is a direction in which the medium D is conveyed by the platen roller 6 and is orthogonal to the left-right direction in the present embodiment.

In the present embodiment, the conveying direction extends from the diagonally upper-rear side to the diagonally lower-front side. In the following description, the upper-rear side in the conveying direction will be referred to as "upstream side", while the lower-front side will be referred to as "downstream side". A direction orthogonal to the left-right direction and the conveying direction will be referred to as "opposing direction". A path along which a medium D passes while being conveyed in the conveying direction will be referred to as "conveying path R."

The thermal head 7 is disposed below the platen roller 6. As the medium D is conveyed in the conveying direction by the rotation of the platen roller 6, the thermal head 7 is moved relative to the medium D in the conveying direction. As illustrated in FIG. 2, the thermal head 7 is a line head and includes a substrate 71, a glaze layer 72, a plurality of heating elements 73, and a driver IC 74 (see FIG. 3).

The substrate 71 extends in both the left-right direction and the conveying direction so as to extend orthogonal to the opposing direction. The glaze layer 72 and the heating elements 73 are disposed on a surface of the substrate 71 that faces diagonally upward and frontward (hereinafter referred to as "front surface of the substrate 71"). The glaze layer 72 protrudes upward from the front surface of the substrate 71. The glaze layer 72 extends in the left-right direction between a portion near a left end portion and a portion near a right end portion of the substrate 71. The glaze layer 72 serves as a foundation for fixing the heating elements 73 to the substrate 71.

The heating elements 73 are fixed to the glaze layer 72 and aligned in the left-right direction. Each of the heating elements 73 is configured to generate heat by being energized. The heating elements 73 is configured to perform printing on a medium D by generating heat while contacting the medium D, which is pressed against the front surface of the substrate 71 by the platen roller 6. The driver IC 74 is configured to energize selected one or more heating elements 73 on the basis of print data so that the selected one or more heating elements 73 generate heat.

As illustrated in FIG. 3, the heat sink 8 is in contact with a surface of the substrate 71 on the side opposite of the front surface of the substrate 71 (hereinafter referred to as "back surface of the substrate 71") and supports the substrate 71. The heat sink 8 has a plate-like shape and is configured to discharge the heat generated by the plurality of heating elements 73. A compression coil spring 41 is provided inside the case 2. The compression coil spring 41 has an upper end in contact with a lower surface of the heat sink 8 to urge the heat sink 8 upward. The platen roller 6 is pressed against the thermal head 7 due to an urging force of the compression coil spring 41.

As illustrated in FIGS. 2 and 3, the printer 1 further includes a regulating member 3. The regulating member 3 is provided inside the case 2 at a position below the insertion slot 24 and provided upstream of the plurality of heating elements 73 of the thermal head 7 in the conveying direction. The regulating member 3 has a plate-like shape and extends in the left-right direction. The regulating member 3 extends diagonally downward and frontward from the opening edge 223 of the upper cover 22. The regulating member 3 defines the conveying path R of the medium D inside the case 2.

<Electrical Configuration in Printer 1 and Battery Unit 10>

Figure 4:
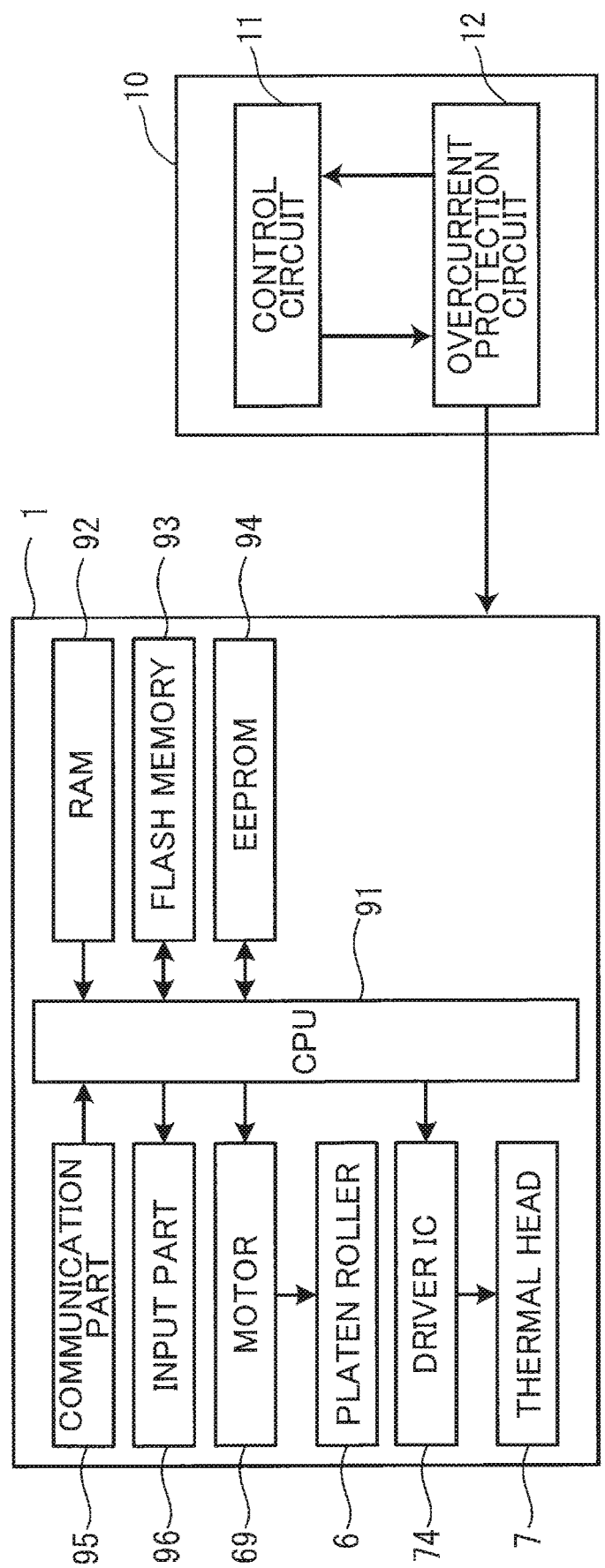
FIG. 4 is a block diagram illustrating an electrical configuration in the printer 1 and a battery unit 10.

Next, an electrical configuration in the printer 1 and the battery unit 10 will be described with reference to FIG. 4. In addition to the input part 96, the motor 69, the platen roller 6, the driver IC 74, and the thermal head 7 described above, the printer 1 further includes a CPU 91, a RAM 92, a flash memory 93, an EEPROM 94, and a communication part 95. The CPU 91 is configured to perform overall control in the printer 1. The CPU 91 is electrically connected to the RAM 92, the flash memory 93, the EEPROM 94, the communication part 95, the input part 96, the motor 69, and the driver IC 74.

The RAM 92 stores therein temporary data such as various variables. The flash memory 93 stores therein print data and programs that the CPU 91 executes for controlling the printer 1. The EEPROM 94 stores therein various settings information.

The communication part 95 is a controller for communicating with external devices via a USB cable connected to the USB jack 95A (see FIG. 1). The motor 69 is configured to drive the platen roller 6 to be rotated. The driver IC 74 is configured to apply voltages to selected one or more heating elements 73 of the thermal head 7 so that the selected one or more heating elements 73 are energized to generate heat.

The battery unit 10 includes a control circuit 11, and an overcurrent protection circuit 12 (hereinafter referred to as "OCP circuit 12"). As will be described later, the control circuit 11 executes controls in the OCP circuit 12, and the OCP circuit 12 is designed to protect the battery unit 10 from overcurrent.

<Overview of Printing Operation>

In the printer 1, selected one or more heating elements 73 in the thermal head 7 are energized, and the energized heating elements 73 apply thermal energy to portions of the medium D that contacts those heating elements 73. A pixel is formed in each portion of the medium D contacting an energized heating element 73 when the heating elements 73 have been energized a prescribed period of time (hereinafter referred to as "energizing time TP"; see FIGS. 5 through 8). Through this process, the printer 1 is configured to form a row of pixels arranged in line (hereinafter referred to as "line") in correspondence with the array of heating elements 73, thereby forming an image for one line.

The printer 1 is configured to intermittently energize the heating elements 73 a plurality of times while driving the motor 69 to rotate the platen roller 6 in order to convey the medium D toward the downstream side in the conveying direction. As a result, a plurality of lines juxtaposed in a direction orthogonal to a direction in which pixels are arranged in an image for one line are formed on the medium D. The plurality of lines form characters and other print images on the medium D in a shade that depends on the formation or non-formation of each pixel.

The above operation will be referred to as "printing operation". The direction in which pixels are aligned in an image for one line formed on the medium D through a printing operation will be referred to as "main scanning direction." Further, a direction orthogonal to the main scanning direction in which the plurality of lines are juxtaposed will be referred to as "sub scanning direction."

<Overview of Divisional Printing>

The greater the number of pixels included in an image for one line, the greater the number of heating elements 73 that are energized in order to perform printing for the one line, and hence, the greater the total amount of current supplied to the thermal head 7 (hereinafter referred to as "total head current IA"). The maximum value for the total head current IA is limited by the following conditions (a) and (b): (a) the maximum current value allowed in the printer 1 (hereinafter referred to as "first current value I1"); and (b) the maximum current value allowed in the OCP circuit 12 in the battery unit 10 (hereinafter referred to as "second current value I2").

The first current value I1 is the maximum current value allowed in the various devices included in the printer 1. Examples of such devices are the battery unit 10, a power supply circuit for stepping down or stepping up the voltage of the battery unit 10 before supplying the voltage to the thermal head 7 and the like, the thermal head 7, and resistors, capacitors, filters, and the like that are connected to the power supply line. The first current value I1 is greater than the second current value I2 (I1>I2).

In the printer 1, the maximum period of time during which a current of the first current value I1 can be continuously supplied will be referred to as "first period of time T1". The maximum period time during which a current of the second current value I2 can be continuously supplied in the OCP circuit will be referred to as "second period of time T2". The first period of time T1 is shorter than the second period of time T2 (T1<T2). The energizing time TP is shorter than both the first period of time T1 and the second period of time T2 (T1>TP, T2>TP).

Here, numbers N1, N2, p, and q will be defined for use in the following description. When N1 heating elements 73 in the plurality of heating elements 73 of the thermal head 7 are energized, the value of the total head current IA will be the first current value I1. When N2 heating elements 73 in the plurality of heating elements 73 of the thermal head 7 are energized, the value of the total head current IA will be the second current value I2.

Further, p is any number satisfying the condition N2<p≤N1. q is any number satisfying the condition q≤N2. The present embodiment assumes that the conditions p=N1 and q=N2 are satisfied.

If the number of heating elements 73 to be energized (hereinafter referred to as "the ON dot number") is large, the printer 1 does not energize all of the heating elements 73 to be energized at once. Specifically, when the number of heating elements 73 to be energized for printing an image for one line exceeds a prescribed number, the printer 1 divides the heating elements 73 to be energized into a plurality of blocks. The prescribed number is q when a first divisional printing process (FIG. 10; described later) is performed, and the prescribed number is p when a second divisional printing process (FIGS. 11 and 12; described later) is performed. The printer 1 prints an image for one line using time division to energize heating elements 73 in the resultant blocks. Printing performed according to this method will be referred to as "divisional printing."

Here, the total head current IA and the number of energized heating elements 73 when executing a divisional printing will be described with reference to FIGS. 5 through 8. For simplicity, the description for FIGS. 5 through 8 assumes that all of the heating elements 73 in the thermal head 7 are energized when printing an image for one line. The blocks into which the plurality of heating elements 73 are divided will be referred to as "first block B(1)", the "second block B(2)", ..., beginning from the first block to be energized. The number of heating elements 73 included in each of the blocks B differs in FIGS. 5 through 8.

Figure 5:
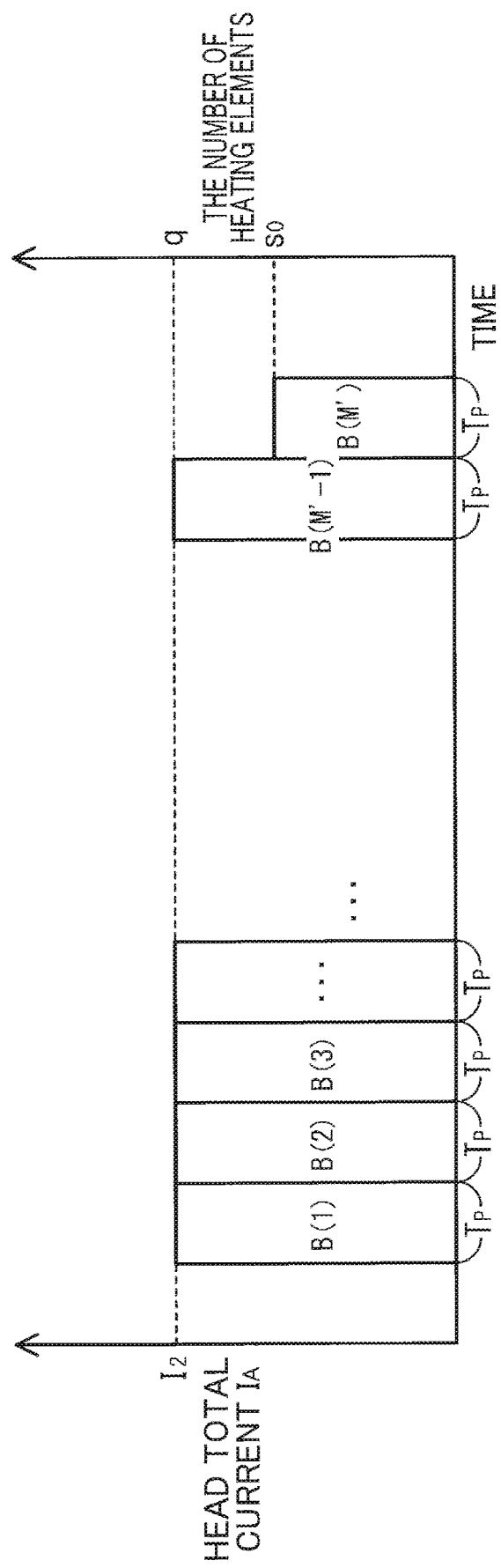
FIG. 5 is a graph for explaining a first example of a divisional printing.

In the first example illustrated in FIG. 5, the heating elements 73 are divided so that the number of heating elements 73 included in each block B is q, and a total number M' of blocks B are created (M' is a natural number not less than three (3)). In this case, the value of the total head current IA for each block B is the second current value I2 since q heating elements 73 are energized in each block B. Note that the M'-th block B(M') includes s0 heating elements 73 (in which s0=x mod q) corresponding to the remainder obtained when the total number x of heating elements 73 is divided by q. In this case, the ON dot number (the total number of heating elements 73 to be energized) is a natural number greater than a natural number obtained by multiplying q by (M'-1).

Hence, when performing a divisional printing by dividing the heating elements 73 as illustrated in FIG. 5, the value of the total head current IA for each of the first block B(1) through (M'-1)-th block B(M'-1) is always the second current value I2. Accordingly, the printer 1 can execute a divisional printing under condition (b), which requires that the value of the total head current IA supplied to the thermal head 7 is always within a range of the current allowed in the OCP circuit. Hereinafter, a divisional printing performed by dividing the heating elements 73 to be energized so that that each block includes the same number of heating elements 73 as exemplified in the first example will be referred to as "first divisional printing".

Note that the bar graph in FIG. 5 illustrates each block B as contacting adjacent blocks B on the left and right sides. In actuality, however, an interval is added after one block B has been energized and before the next block B is energized. Therefore, a period of time during which the value of the total head current IA is the second current value I2 does not continue more than the energizing time TP. The same is applied to FIGS. 6 through 8.

Figure 6:
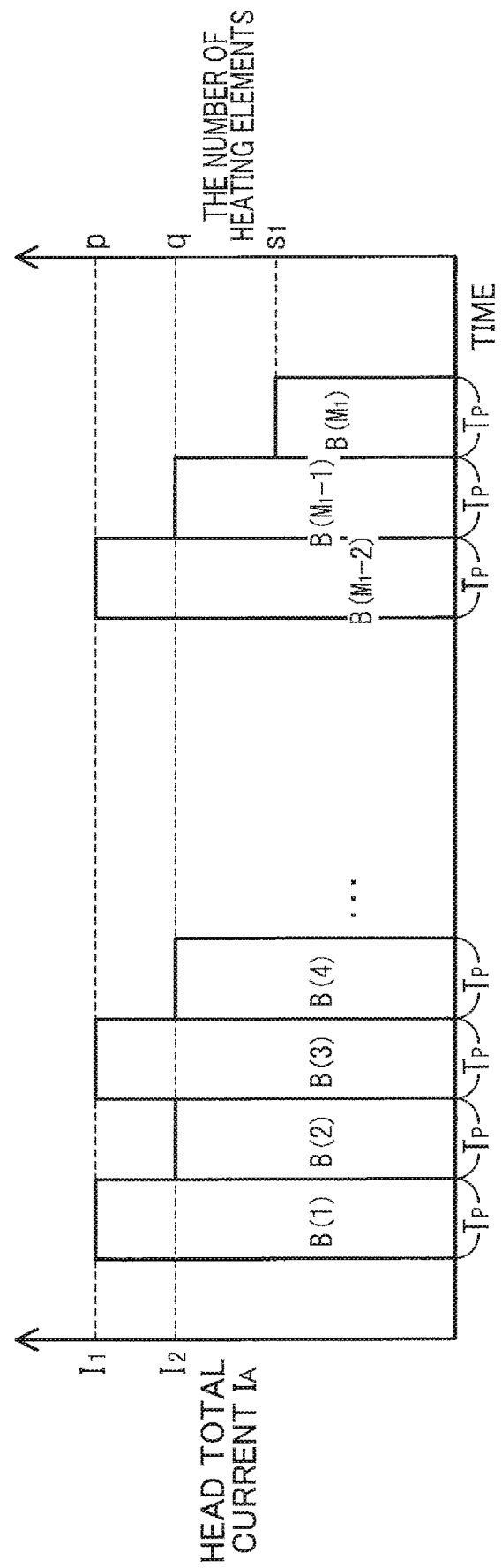
FIG. 6 is a graph for explaining a second example of the divisional printing.
Figure 7:
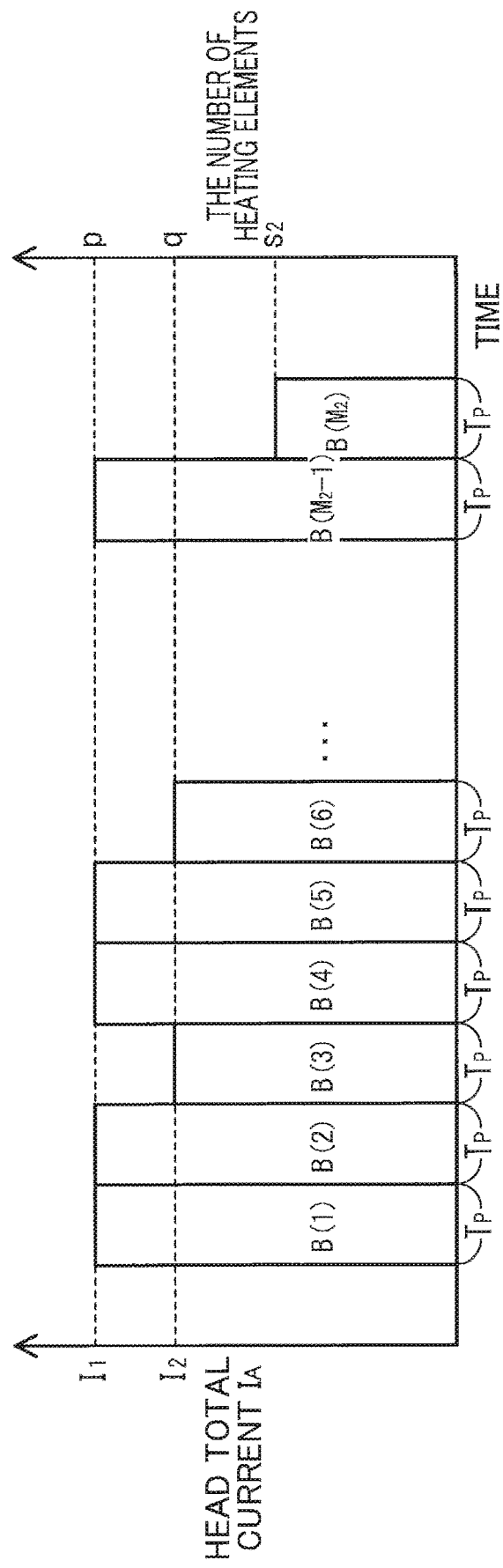
FIG. 7 is a graph for explaining a third example of the divisional printing.
Figure 8:
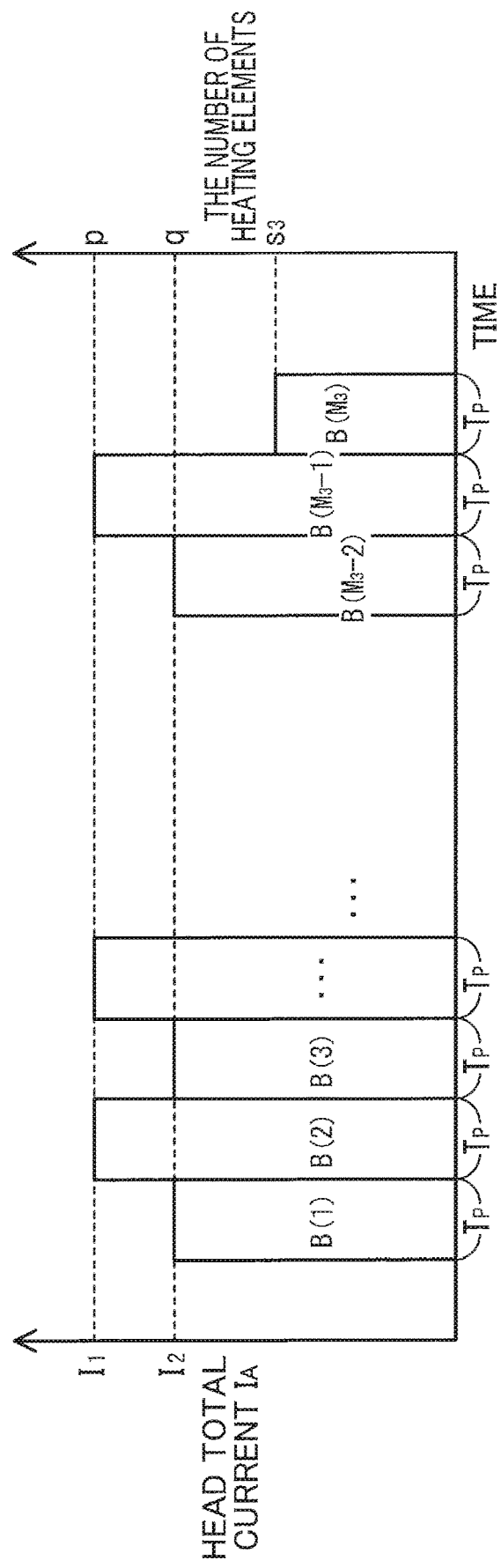
FIG. 8 is a graph for explaining a fourth example of the divisional printing.

In the examples illustrated in FIGS. 6 through 8, on the other hand, the heating elements 73 are divided so that some blocks B configured of p heating elements 73 and some blocks B configured of q heating elements 73. The value of the total head current IA is the first current value I1 in each block B including p heating elements 73, and the second current value I2 in each block B including q heating elements 73. Hereinafter, blocks B configured of p heating elements 73 will be referred to as "high current blocks BH", and blocks B configured of q heating elements 73 will be referred to as "low current blocks BL".

In the second example illustrated in FIG. 6, the heating elements 73 are divided into a total of M1 blocks B. The first block B(1), the third block B(3), ..., and the (M1-2)-th block B(M1-2) are high current blocks BH, while the second block B(2), the fourth block B(4), ..., the (M1-1)-th block B(M1-1) are low current blocks BL. The high current blocks BH and the low current blocks BL are energized alternately. The M1-*th* block B(M1) includes s1 heating elements 73 calculated according to the following equation, in which CH1 denotes the number of high current blocks BH and CL1 denotes the number of low current blocks BL.

$$s1 = x - ((p \times CH1) + (q \times CL1))$$

In the third example illustrated in FIG. 7, the heating elements 73 are divided into a total of M2 blocks B. The first block B(1), the second block B(2), the fourth block B(4), the fifth block B(5), ..., and the (M2-1)-th block B(M2-1) are high current blocks BH, while the third block B(3), the sixth block B(6), ... are low current blocks BL. The high current blocks BH and the low current blocks BL are energized in the sequence of high current block BH, high current block BH, low current block BL, high current block BH, high current block BH, low current block BL, .... The M2-*th* block B(M2) includes s2 heating elements 73 calculated according to the following equation, in which CH2 denotes the number of high current blocks BH and CL2 denotes the number low current blocks BL.

$$s2=x-((p\times CH2)+(q\times CL2))$$

In the fourth example illustrated in FIG. 8, the heating elements 73 are divided into a total of M3 blocks B. The first block B(1), the third block B(3), . . . , and the (M3-2)-th block B(M3-2) are low current blocks BL, while the second block B(2), the fourth block B(4), . . . , and (M3-1)-th block B(M3-1) are high current blocks BH. The low current blocks BL and the high current blocks BH are energized alternately. The M3-*th* block B(M3) includes s3 heating elements 73 calculated according to the following equation, in which CH3 denotes the number of high current blocks BH and CL3 denotes the number of low current blocks BL.

$$s3=x-((p\times CH3)+(q\times CL3))$$

Hereinafter, M1, M2, and M3 will be collectively referred to as "M" (M is a natural number not less than three (3)).

Hence, when the first block B(1) is a high current block BH, as in the second and third examples (see FIGS. 6 and 7), at least one of the blocks B, excluding the first block B(1) and the M-th block B(M), is a low current block BL. On the other hand, when the first block B(1) is a low current block BL, as in the fourth example (see FIG. 8), at least one of the blocks B, excluding the first block B(1) and the M-th block B(M), is a high current block BH. Since the blocks B include at least one high current block BH and at least one low current block BL as described above, the ON dot number (the number of heating elements 73 to be energized for printing for one line) is a natural number greater than a natural number obtained by adding p to q) when the second divisional printing is performed.

When a divisional printing is executed by dividing the heating elements 73 into blocks, as illustrated in FIGS. 6 through 8, the value of the total head current IA when energizing each block does not become greater than the first current value I1. Additionally, the energizing time TP during which heating elements 73 are energized in each block B is shorter than the first period of time T1. Accordingly, the printer 1 can execute a divisional printing under condition (a), which requires that the value of the total head current IA supplied to the thermal head 7 always be within the allowable range of the printer 1.

Further, the total number M of blocks B in the second through fourth examples illustrated in FIGS. 6 through 8 is smaller than the total number M' of blocks B in the first example illustrated in FIG. 5 (M'>M). Accordingly, by performing the divisional printing based on the blocks B into which the plurality of heating elements 73 to be energized are divided according to the methods illustrated in the second through fourth examples, the printer 1 can reduce a period of time required to complete printing an image for one line.

Hereinafter, a divisional printing illustrated in the second through fourth examples for dividing the heating elements 73 into high current blocks BH and low current blocks BL will be referred to as "second divisional printing".

<Main Process>

Next, a main process will be described with reference to FIGS. 9 through 12. The main process is started when a start command that specifies a prescribed image to be printed and commands start of a printing operation is inputted via the communication part 95 or the input part 96. At this time, the CPU 91 reads and executes a program stored in the flash memory 93 in order to start the main process.

Figure 9:
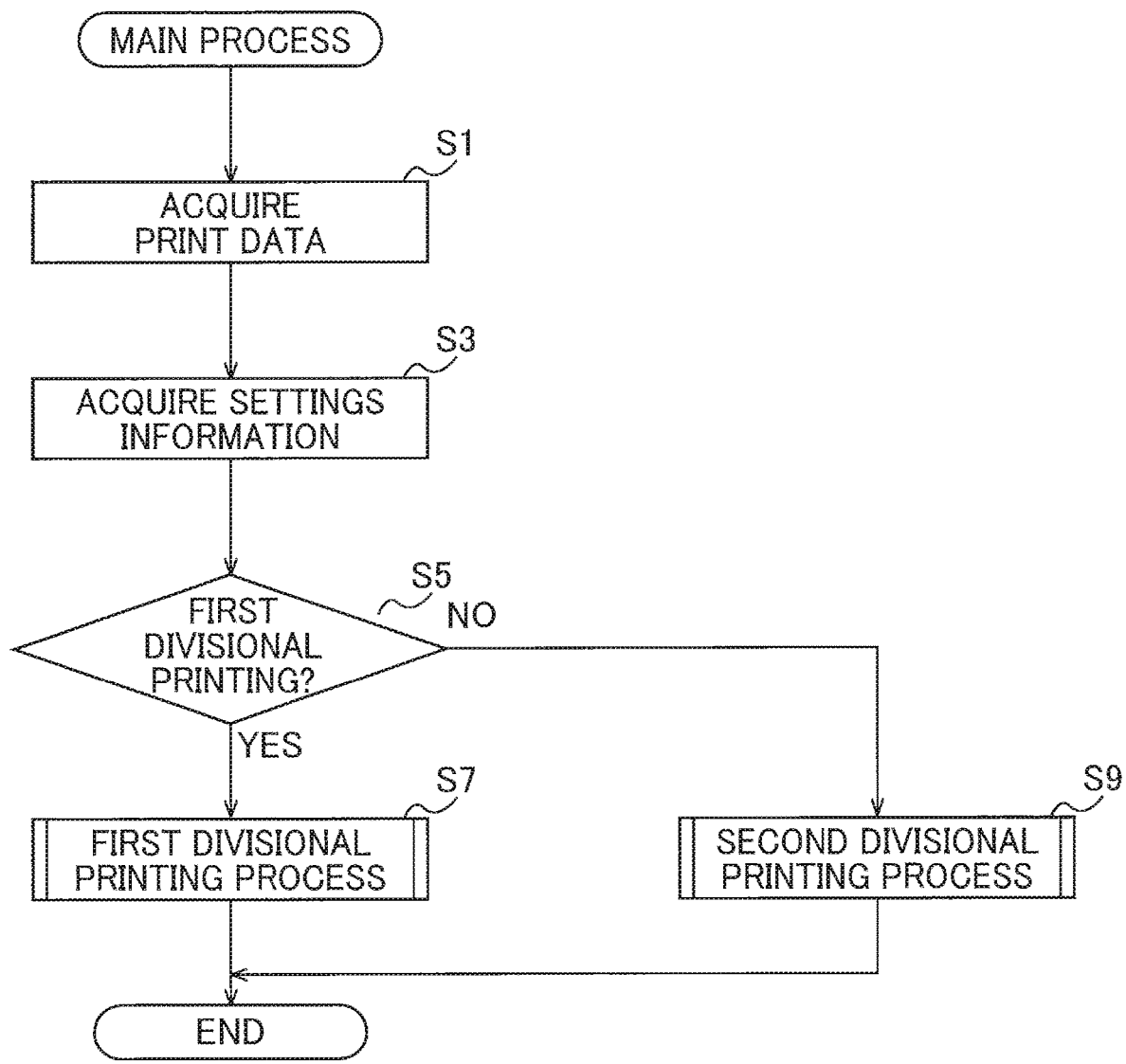
FIG. 9 is a flowchart illustrating steps in a main process.

In S1 at the beginning of the process in FIG. 9, the CPU 91 reads and acquires print data from the flash memory 93 for printing the image specified by the start command inputted via the communication part 95 or the input part 96. The print data includes information specifying rows of pixels for a plurality of lines included in the image. The following description is based on an assumption that the print image has a total of K lines. The K lines are referred to as "first line," "second line," . . . , "K-th line" in their printing order.

In S3 the CPU 91 reads and acquires settings information from the EEPROM 94. The settings information indicates whether to perform one of a first divisional printing (see FIG. 5) and a second divisional printing (see FIGS. 6 through 8). When the CPU 91 determines that the first divisional printing is to be performed on the basis of the acquired settings information (S5: YES), in S7 the CPU 91 executes the first divisional printing process illustrated in FIG. 10. On the other hand, when the CPU 91 determines that second divisional printing is to be performed on the basis of the settings information (S5: NO), in S9 the CPU 91 executes the second divisional printing process illustrated in FIG. 11 or FIG. 12. After completing one of the first divisional printing process and the second divisional printing process, the CPU 91 ends the main process. Details of the first divisional printing process and the second divisional printing process will be described later.

<First Divisional Printing Process>

Figure 10:
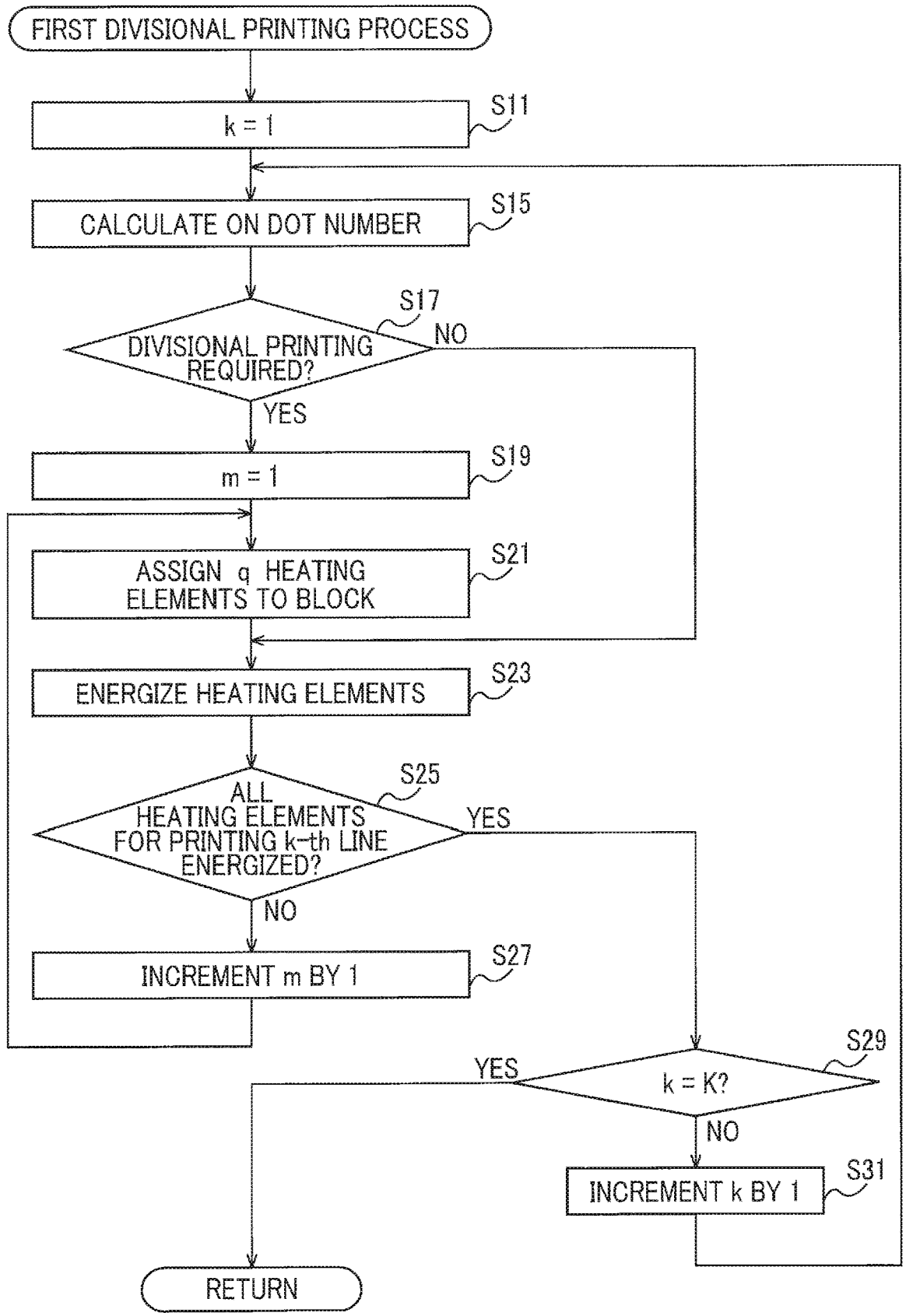
FIG. 10 is a flowchart illustrating steps in a first divisional printing process.

The first divisional printing process will be described with reference to FIG. 10. The first divisional printing process corresponds to the first example of the divisional printing illustrated in FIG. 5. In S11 of FIG. 10, the CPU 91 sets a variable k stored in the RAM 92 to 1 in order to initialize the same. On the basis of the print data acquired through the process of S1 described in FIG. 9, the CPU 91 identifies the total number K of lines included in the image to be printed.

In S15 the CPU 91 calculates, on the basis of the print data, the number of heating elements 73 to be energized (the ON dot number) when printing the k-th line. In S17 the CPU 91 determines, on the basis of the ON dot number calculated in S15, whether a divisional printing is required for printing the k-th line. When the calculated ON dot number is greater than q, the CPU 91 determines that a divisional printing is necessary (S17: YES).

In S19 the CPU 91 initializes a variable m stored in the RAM 92 by setting the variable m to 1. In S21 the CPU 91 extracts q heating elements 73 from the plurality of heating elements 73 to be energized for printing the k-th line and assigns the extracted heating elements 73 as the heating elements 73 in the m-th block B(m). In S23 the CPU 91 energizes the heating elements 73 assigned to the m-th block B(m) so that the energized heating elements 73 generate heat for printing a portion of the image of the k-th line that corresponds to the m-th block B(m). Subsequently, the CPU 91 advances to the process in S25.

In S25 the CPU 91 determines whether all of the heating elements 73 that are to be energized for printing the k-th line have been assigned to a block B in the process of S21. That is, the CPU 91 determines in S25 whether all of the heating elements 73 determined to be energized to print an image for the k-th line in S15 have been energized. When the CPU 91 determines in S25 there remain any heating elements 73 that were not assigned to a block B (S25: NO), in S27 the CPU 91 increments the variable m by 1 and returns to the process in S21.

In S21 the CPU 91 again extracts q heating elements 73 from among the heating elements 73 to be energized for printing the k-th line that have not been assigned to a block B and assigns the extracted q heating elements 73 as heating elements 73 in the m-th block B(m) for the updated variable m. In S23 the CPU 91 performs energization for the heating elements 73 assigned to the m-th block B(m) such that the heating elements 73 generate heat for printing a portion of the k-th line corresponding to the m-th block B(m).

Through the above process, the heating elements 73 that are energized for printing the k-th line are divided equally into groups configured of q heating elements 73 and assigned to individual blocks B. The k-th line is then printed on the medium D as energization for the heating elements 73 is performed at a different timing for each block B (see FIG. 5).

When the CPU 91 determines that all heating elements 73 to be energized for printing the image for the k-th line have been assigned to one of the blocks B (S25: YES), in S29 the CPU 91 determines whether the variable k matches the total number K of lines in the image to be printed. When the CPU 91 determines in S29 that the variable k is smaller than the total number K (S29: NO), in S31 the CPU 91 increments the variable k by 1 and returns to the process in S15. Subsequently, the CPU 91 repeats the process in S15 to S27 on the basis of the updated variable k.

When the CPU determines in S29 that the variable k matches the total number K of lines included in the image to be printed (S29: YES), the CPU 91 ends the first divisional printing process and returns to the main process in FIG. 9.

On the other hand, when the calculated ON dot number is less than or equal to q in the process of S17, the CPU 91 determines that a divisional printing is not necessary (S17: NO). In this case, in S23 the CPU 91 energizes all of the heating elements 73 to be used for performing printing for the k-th line in order for the heating elements 73 generate heat. Since all heating elements 73 for printing the k-th line are energized in this case (S25: YES), the CPU 91 advances to S29. The subsequent process in S29 and S31 is identical to a case when a divisional printing is required and, hence, a description of the process will not be repeated.

<Second Divisional Printing Process>

The second divisional printing process will be described with reference to FIGS. 11 and 12. The second divisional printing process illustrated in FIG. 11 corresponds to the second example of the divisional printing (see FIG. 6). The second divisional printing process illustrated in FIG. 12 corresponds to the third example of the divisional printing (see FIG. 7). The CPU 91 acquires settings information specifying which of the second divisional printing processes to perform by reading the settings information from the EEPROM 94. Thus, the CPU 91 executes the selected one of the second divisional printing processes in FIGS. 11 and 12 on the basis of the acquired settings information. In the following description, steps identical to those described in the first divisional printing process are designated with the same step numbers to avoid duplicating description.

<Second Divisional Printing Process (Second Example)>

Figure 11:
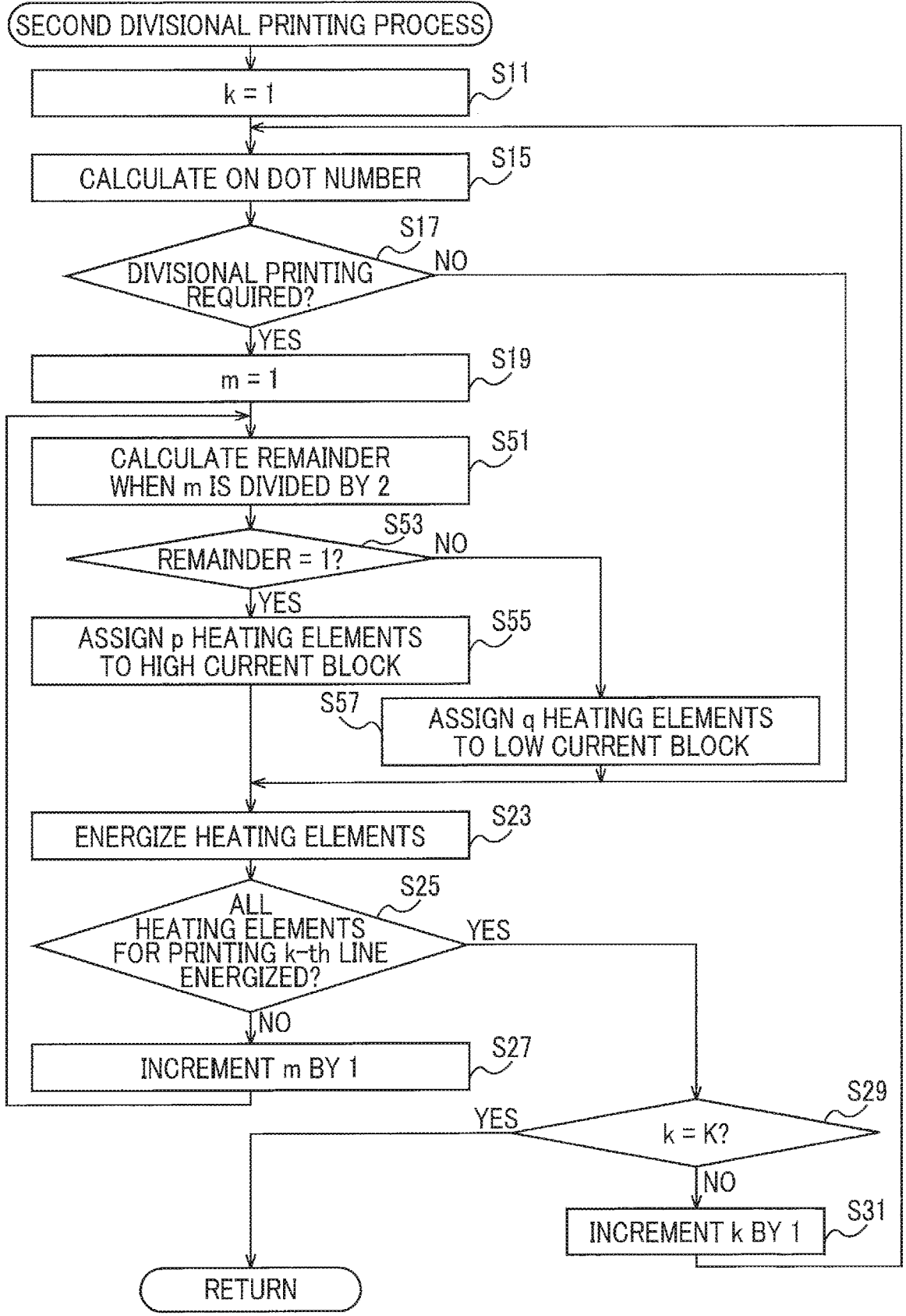
FIG. 11 is a flowchart illustrating steps in a second divisional printing process corresponding to the second example.
Figure 12:
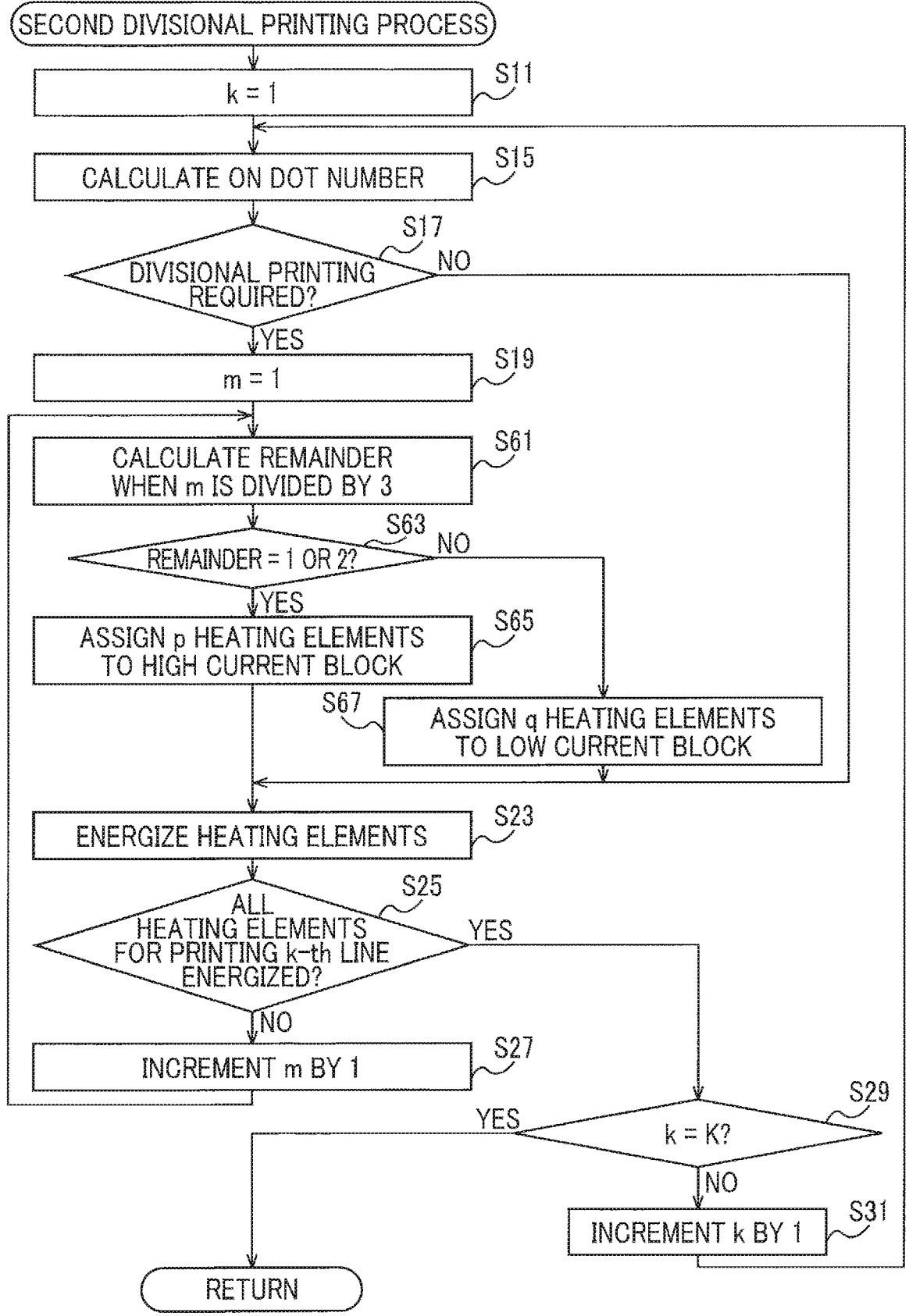
FIG. 12 is a flowchart illustrating steps in the second divisional printing process corresponding to the third example.

In S17 of FIG. 11, the CPU 91 determines whether a divisional printing is required for printing the k-th line on the basis of the number of heating elements 73 to be energized when printing the k-th line (the ON dot number). When the calculated ON dot number is greater than p, the CPU 91 determines that a divisional printing is required (S17: YES).

In S19 the CPU 91 sets the variable m stored in the RAM 92 to 1 in order to initialize the variable m. In S51 the CPU 91 calculates the remainder when the variable m is divided by 2 (two). In S53 the CPU 91 determines whether the calculated remainder is 1.

When the CPU 91 determines that the remainder is 1 (S53: YES), in S55 the CPU 91 extracts p heating elements 73 from among the heating elements 73 to be energized for printing the k-th line, and assigns the extracted heating elements 73 as heating elements 73 included in the m-th block B(m). Since the m-th block B(m) includes p heating elements 73, the m-th block B(m) corresponds to a high current block BH.

On the other hand, when the CPU 91 determines that the remainder is not 1 (S53: NO), in S57 the CPU 91 extracts q heating elements 73 from among the heating elements 73 to be energized for printing for the k-th line, and assigns the extracted heating elements 73 as heating elements 73 included in the m-th block B(m). Since the m-th block B(m) includes q heating elements 73, the m-th block B(m) corresponds to a low current block BL.

In S23 the CPU 91 energizes the heating elements 73 assigned to the m-th block B(m) so that the energized heating elements 73 generate heat for printing a portion that corresponds to the m-th block B(m) in the image for the k-th line. Subsequently, the CPU 91 advances to the process in S25.

By executing the above process while updating the variable m, heating elements 73 that are energized for printing the k-th line are divided into a plurality of high current blocks BH (the first block B(1), the third block B(3), the fifth block B(5), . . . ) and a plurality of low current blocks BL (the second block B(2), the fourth block B(4), the sixth block B(6), . . . ). The k-th line is formed on the medium D by heating elements 73 included in a high current block BH and heating elements 73 included in a low current block BL (see FIG. 6) alternately generating heat.

When the CPU 91 determines that the variable k matches the total number K of lines in the image to be printed (S29: YES), the CPU 91 ends the second divisional printing process and returns to the main process in FIG. 9.

<Second Divisional Printing Process (Fourth Example)>

By modifying a portion of the process in FIG. 11 (S55, S57), the CPU 91 can execute the second divisional printing process corresponding to the fourth example of the divisional printing (see FIG. 8). The detailed description will be made below. When the CPU 91 determines in S53 that the remainder is 1 (S53: YES), in S55 the CPU 91 extracts q heating elements 73 from among the heating elements 73 to be energized for printing the k-th line, and the CPU 91 assigns the extracted heating elements 73 as heating elements 73 included in the m-th block B(m). Since the m-th block B(m) includes q heating elements 73, the m-th block B(m) corresponds to a low current block BL.

On the other hand, when the CPU 91 determines that the remainder is not 1 (S53: NO), in S57 the CPU 91 extracts p heating elements 73 from among the heating elements 73 to be energized for printing the k-th line, and assigns these extracted heating elements 73 as the heating elements 73 in the m-th block B(m). Since the m-th block B(m) includes p heating elements 73, the m-th block B(m) corresponds to a high current block BH.

By executing the above process while updating the variable m, the heating elements 73 that are energized for printing the k-th line are divided into a plurality of low current blocks BL (the first block B(1), the third block B(3), the fifth block B(5), . . . ) and a plurality of high current blocks BH (the second block B(2), the fourth block B(4), the sixth block B(6), . . . ). Further, the k-th line is formed on the medium D by heating elements 73 included in a low current block BL and heating elements 73 included in a high current block BH (see FIG. 8) alternately generating heat upon energization.

<Second Divisional Printing Process (Third Example)>

The second divisional printing process illustrated in FIG. 12 differs from the second divisional printing process illustrated in FIG. 11 as follows. In S61 the CPU 91 calculates the remainder when the variable m is divided by 3 (three). In S63 the CPU 91 determines whether or not the calculated remainder is one of 1 and 2.

When the CPU 91 determines that the remainder is one of 1 and 2 (S63: YES), in S65 the CPU 91 extracts p heating elements 73 from among the heating elements 73 to be energized for printing the k-th line, and assigns the extracted heating elements 73 as the heating elements 73 in the m-th block B(m). Since the m-th block B(m) includes p heating elements 73, the m-th block B(m) corresponds to a high current block BH.

When the CPU 91 determines that the remainder is neither 1 nor 2 (S63: NO), in S67 the CPU 91 extracts q heating elements 73 from among the heating elements 73 to be energized for printing the k-th line, and assigns the extracted heating elements 73 as heating elements 73 in the m-th block B(m). Since the m-th block B(m) includes q heating elements 73, the m-th block B(m) corresponds to a low current block BL.

In S23 the CPU 91 energizes the heating elements 73 assigned to the m-th block B(m) so that the heating elements 73 generate heat to print a portion that corresponds to the m-th block B(m) in the image for the k-th line. Subsequently, the CPU 91 advances to the process of S25.

By executing the above process while updating the variable m, the heating elements 73 to be energized for printing the k-th line are divided into high current blocks BH (the first block B(1), the second block B(2), the fourth block B(4), the fifth block B(5), . . . ) and low current blocks BL (the third block B(3), the sixth block B(6), . . . ). Further, the k-th line is formed on the medium D as heating elements 73 included in high current blocks BH and heating elements 73 included in low current blocks BL (see FIG. 7) generate heat.

<Operations and Advantages of Embodiment>

The printer 1 is configured to print an image for one line by dividing the heating elements 73 in the thermal head 7 to be energized into the total number M of blocks B and energizing the heating elements 73 to generate heat at a different timing for each block B. Here, the total number M of blocks B includes high current blocks BH and low current blocks BL that have different numbers of heating elements 73 (see FIGS. 6 through 8). The number p of the heating elements 73 included in a high current block BH is larger than the number q of heating elements 73 included in a low current block BL (p>q). This method requires less time for performing printing than a method in which the heating elements 73 are divided into blocks B that are all low current blocks BL (see FIG. 5). Therefore, during a divisional printing in which printing is performed after dividing the heating elements 73 into blocks B, the printer 1 can shorten a period of time required for printing an image for one line.

The number P of heating elements 73 included in a high current block BH is equivalent to the number $N_1$ in the embodiment described above. Here, the value of the total head current IA is the first current value I1 when N1 heating elements 73 are simultaneously energized. The first current value I1 is the maximum current value allowed in the printer 1 (see condition (a)). Therefore, the printer 1 can maximize the number of heating elements 73 in a high current block BH within the allowable range of the printer 1. In this case, the printer 1 can minimize the number of divisions made when dividing heating elements 73 into a total of M blocks B while keeping the total head current IA within the allowable range of the printer 1. Accordingly, the printer 1 can maximally reduce the period of time required for printing an image for one line.

The number q heating elements 73 included in a low current block BL is equivalent to the number N2 in the embodiment described above. Here, the value of the total head current IA is the second current value I2 when N2 heating elements 73 are simultaneously energized. The second current value I2 is the maximum current value allowed in the OCP circuit (see condition (b)) in the printer 1. Therefore, the printer 1 can reduce the possibility of damage to the OCP circuit when current is supplied to heating elements 73 in a low current block BL.

The first period of time T1 during which heating elements 73 can be energized in a high current block BH is shorter than the second period of time T2, which is the maximum time during which the second current value 12 can be supplied continuously to the OCP circuit (T1<T2). Therefore, the printer 1 can reduce the potential for damage to the OCP circuit, even when energizing heating elements 73 in a high current block BH.

Note that the energizing time TP for energizing the plurality of heating elements 73 required for forming pixels when performing printing on the medium D is shorter than both the first period of time T1 and the second period of time T2 (T1>TP, T2>TP). Therefore, the printer 1 can reduce the possibility of damage to the various devices in the printer 1 when energizing heating elements 73 in a high current block BH. The printer 1 can also reduce the potential for damage to the OCP circuit when energizing heating elements 73 in a low current block BL.

When performing printing, the printer 1 can determine which to perform one of: a first divisional printing process (see FIG. 10) in which printing is performed by dividing the heating elements 73 into a total number M' of blocks B, each having the same number of heating elements 73; and a second divisional printing process (see FIGS. 11 and 12) in which printing is performed by dividing the heating elements 73 into a total of M blocks B that include high current blocks BH and low current blocks BL.

<Modifications and Variations of Embodiment>

While the invention has been described in conjunction with various example structures outlined above and illustrated in the figures, various alternatives, modifications, variations, improvements, and/or substantial equivalents, whether known or that may be presently unforeseen, may become apparent to those having at least ordinary skill in the art. Accordingly, the example embodiments of the disclosure, as set forth above, are intended to be illustrative of the invention, and not limiting the invention. Various changes may be made without departing from the spirit and scope of the disclosure. Therefore, the disclosure is intended to embrace all known or later developed alternatives, modifications, variations, improvements, and/or substantial equivalents. Some specific examples of potential alternatives, modifications, or variations in the described invention are provided below:

For example, the number p indicative of the number of heating elements 73 included in a high current block BH need not be the same as the number N1 but may be modified within a range satisfying the condition $N2<p \leq N1$. Similarly, the number q indicative of the number of heating elements 73 in a low current block BL need not be the same as the number N2 but may be modified within a range satisfying the condition q≤N2.

When performing printing for one line, the respective numbers of high current blocks BH and low current blocks BL and an order in which these blocks B are energized are not limited to the embodiment described above but may be modified as needed. For example, the heating elements 73 energized for printing a k-th line may be divided into high current blocks BH (the first block B(1), the fourth block B(4), . . . ) and low current blocks BL (the second block B(2), the third block B(3), the fifth block B(5), the sixth block B(6), . . . ).

The number N1 is not limited to the number of heating elements 73 that are energized simultaneously when the value of the total head current IA is the first current value I1. For example, the number N1 may be the number of heating elements 73 that are energized simultaneously when the value of the total head current IA is the rated current set in the printer 1.

The number N2 is not limited to the number of heating elements 73 that are energized simultaneously when the value of the total head current IA is the second current value I2. For example, the number N2 may be the number of heating elements 73 that are energized simultaneously when the value of the total head current IA is the rated current set in the battery unit 10.

<Remarks>

The printer 1 is an example of the image forming apparatus. The medium D is an example of the printing target. The CPU 91 is an example of the controller. The process in S9 is an example of the first one-line printing process. The processes in S55, S57, S65, and S67 are example of the dividing in the first one-line printing process. The ON dot number is an example of the selected R heating elements. The process in S23 in the second divisional printing process is an example of the energizing in the first one-line printing process. The process in S7 is an example of the second one-line printing process. The process in S21 is an example of the dividing in the second one-line printing process. The process in S23 in the first divisional printing process is an example of the energizing in the second one-line printing process. The M' blocks in the first divisional printing process is an example of the S blocks. The process in S5 is an example of the determining.

What is claimed is:

1. An image forming apparatus comprising:
   a thermal head comprising a plurality of heating elements arrayed in a main scanning direction, each heating element being configured to generate heat by being energized, the thermal head being configured to form an image on a printing target on the basis of print data using the plurality of heating elements while moving in a sub scanning direction relative to the printing target; and
   a controller configured to execute a first one-line printing process to perform printing for one line extending in the main scanning direction, the first one-line printing process comprising:
   dividing selected R heating elements into M blocks consisting of a 1-st block to an M-th block such that the M blocks include at least one high current block consisting of p heating elements of the selected R heating elements and at least one low current block consisting of q heating elements of the selected R heating elements, in which:
   R is a natural number greater than a natural number obtained by adding p to q;
   M is a natural number not less than three (3);
   p is a natural number greater than N2 and not greater than N1;
   q is a natural number not greater than N2;
   N1 is a maximum number of the heating elements that can be energized simultaneously in the plurality of heating elements; and
   N2 is a natural number smaller than N1; and
   energizing the M blocks at different timings in order of the 1-st block to the M-th block to thereby perform printing for the one line,
   wherein, in a case where the 1-st block is determined as the high current block in the dividing, at least one block of the M blocks excluding the M-th block is determined as the low current block, and
   wherein, in a case where the 1-st block is determined as the low current block in the dividing, at least one block of the M blocks excluding the M-th block is determined as the high current block.

2. The image forming apparatus according to claim 1, wherein a total current value when N1 heating elements of the plurality of heating elements are simultaneously energized is a first current value based on a maximum allowable current value in the image forming apparatus.

3. The image forming apparatus according to claim 1, wherein a total current value when N2 heating elements of the plurality of heating elements are simultaneously energized is a second current value based on a maximum allowable current value determined according to an overcurrent protection circuit for a power supply of the image forming apparatus.

4. The image forming apparatus according to claim 3, wherein the p heating elements in the high current block are allowed to be continuously energized simultaneously for a maximum of up to a first period of time, and
   wherein the overcurrent protection circuit allows continuous energization with a current of the second current value for a maximum of up to a second period of time that is longer than the first period of time.

5. The image forming apparatus according to claim 1, wherein the controller is configured to further execute a second one-line printing process to perform printing for one line extending in the main scanning direction, the second one-line printing process comprising:
   dividing the selected R heating elements into S blocks consisting of a 1-st block to an S-th block such that at least the 1-st to (S-1)-th blocks each consist of the q heating elements of the selected R heating elements, in which:
   S is a natural number not less than three (3); and
   R is a natural number greater than a natural number obtained by multiplying q by (S-1); and
   energizing the S blocks at different timings to thereby perform printing for the one line, and
   wherein the controller is configured to perform:
   determining which to perform the first one-line printing process or the second one-line printing process for performing printing for a target one line that is one line targeted for printing; and
   executing one of the first one-line printing process and the second one-line printing process, whichever is determined in the determining, to perform printing for the target one line.

* * * * *